(12) United States Patent
Sommerfeld

(10) Patent No.: US 8,153,925 B2
(45) Date of Patent: Apr. 10, 2012

(54) HEAT EXCHANGER AND MOISTURE REMOVAL FOR A PLASMA CUTTING SYSTEM

(75) Inventor: Troy A. Sommerfeld, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 959 days.

(21) Appl. No.: 12/116,914

(22) Filed: May 7, 2008

(65) Prior Publication Data

US 2009/0159574 A1    Jun. 25, 2009

Related U.S. Application Data

(60) Provisional application No. 61/015,140, filed on Dec. 19, 2007.

(51) Int. Cl.
*B23K 10/00* (2006.01)
(52) U.S. Cl. .......... 219/121.39; 219/121.44; 219/121.48
(58) Field of Classification Search ............. 219/121.39, 219/121.45, 121.44, 121.48, 121.54, 121.57, 219/74
See application file for complete search history.

(56) References Cited

U.S. PATENT DOCUMENTS

| | | | |
|---|---|---|---|
| 2,410,522 A | 11/1946 | Powell | |
| 2,423,677 A | 7/1947 | Balogh | |
| 4,918,285 A | 4/1990 | Thommes | |
| 4,943,699 A | 7/1990 | Thommes | |
| 5,086,205 A | 2/1992 | Thommes | |
| 5,194,714 A * | 3/1993 | Le Sergent | 219/121.36 |
| 5,362,207 A | 11/1994 | Martin et al. | |
| 5,541,857 A | 7/1996 | Walter et al. | |
| 5,681,368 A | 10/1997 | Rahimzadeh | |
| 6,130,398 A | 10/2000 | Schneider et al. | |
| 6,220,045 B1 | 4/2001 | Kim et al. | |
| 6,220,245 B1 | 4/2001 | Takabayashi et al. | |
| 6,313,431 B1 | 11/2001 | Schneider et al. | |
| 6,785,980 B1 | 9/2004 | Koelzer | |
| 6,832,900 B2 | 12/2004 | Leu | |
| 6,989,509 B2 | 1/2006 | Silvestro | |
| 7,022,935 B1 | 4/2006 | Matus et al. | |
| 7,379,483 B2 * | 5/2008 | Denney et al. | 372/38.02 |
| 2001/0042736 A1 | 11/2001 | Schneider et al. | |
| 2003/0042237 A1 | 3/2003 | Brofft et al. | |
| 2004/0003853 A1 | 1/2004 | Bankstahl et al. | |
| 2005/0109738 A1 | 5/2005 | Hewett et al. | |

(Continued)

FOREIGN PATENT DOCUMENTS

EP    1082992 A    3/2001

(Continued)

OTHER PUBLICATIONS

U.S. Appl. No. 11/960,425, filed Dec. 19, 2007, Salsich.

(Continued)

*Primary Examiner* — Mark Paschall
(74) *Attorney, Agent, or Firm* — Fletcher Yoder

(57) ABSTRACT

A system is provided that includes a torch power unit. The torch power unit includes a compressor and a moisture remover coupled to the compressor. A method is provided that includes compressing a gas via compressor and removing moisture from the gas via a moisture remover coupled to the compressor. A method of manufacturing a torch system is also provided. Additionally, a system for a torch power unit is provided that includes a moisture remover.

25 Claims, 3 Drawing Sheets

U.S. PATENT DOCUMENTS

Figure 1:
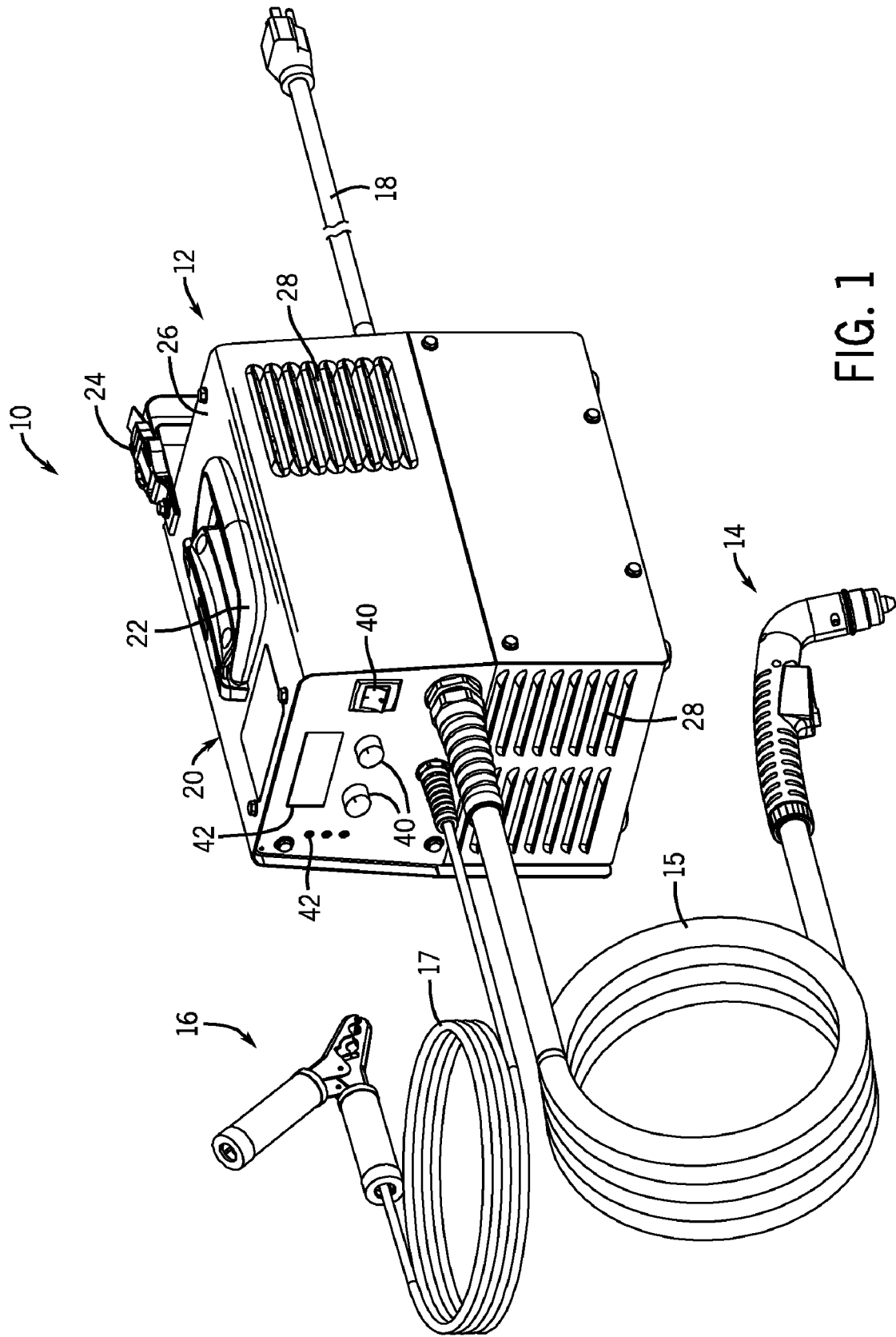

| | | | |
|---|---|---|---|
| 2005/0155959 A1 | 7/2005 | Bender et al. | |
| 2005/0201868 A1 | 9/2005 | Gao et al. | |
| 2007/0235428 A1* | 10/2007 | Schneider | 219/121.54 |
| 2008/0023449 A1 | 1/2008 | Salsich et al. | |
| 2008/0023451 A1 | 1/2008 | Salsich et al. | |
| 2008/0149602 A1 | 6/2008 | Lenzner et al. | |

FOREIGN PATENT DOCUMENTS

| | | |
|---|---|---|
| GB | 631194 A | 10/1949 |
| JP | 56052598 A | 5/1981 |
| WO | 2007/113389 A | 10/2007 |

OTHER PUBLICATIONS

U.S. Appl. No. 11/960,494, filed Dec. 19, 2007, Salsich.

U.S. Appl. No. 11/960,514, filed Dec. 19, 2007, Salsich et al.

Millerwelds; Article entitled "Spectrum 125C—The Power of Blue;" issued Mar. 2007; Index No. PC/13.0; www.millerselds.com/pdf/spec_sheets/PC13-0.pdf; 4 pages.

Millerwelds; Owner's Manual entitled "Spectrum 125C and ICE-12C Torch;" www.millerwelds.com/om/o2248e_mil.pdf; 32 pages; dated 2006.

* cited by examiner

HEAT EXCHANGER AND MOISTURE REMOVAL FOR A PLASMA CUTTING SYSTEM

CROSS REFERENCE TO RELATED APPLICATIONS

This application claims priority to and the benefit of U.S. Provisional Application No. 61/015,140, entitled "Heat Exchanger and Moisture Removal for a Plasma Cutting System," filed Dec. 19, 2007, the disclosure of which is incorporated herein by reference.

BACKGROUND

The invention relates generally to metal cutting and welding systems, and more particularly to plasma cutting systems.

A plasma cutting system creates plasma (e.g., high temperature ionized gas) to cut metal or other electrically conductive material. In general, an electrical arc converts a gas (e.g., compressed air) into plasma, which is sufficiently hot to melt the work piece while the pressure of the gas blows away the molten metal. The power output and flow of the gas can affect the performance of the system. Moreover, environmental conditions can affect the performance of the system. Unfortunately, existing systems do not account for variations in environmental conditions.

In some instances, these units may be taken to or located in an area of high relatively humidity. In these instances, the compression cycle of a compressor may entrain moisture in the compressed air supplied to the torch. As the air cools after being exhausted from the compressor, the moisture may be pulled out of the air stream and condense as water droplets at the tip of the plasma torch. The water may be undesirable for various reasons, and it may also adversely affect the user's perception of the plasma cutting system.

BRIEF DESCRIPTION

In one embodiment, a system includes a torch power unit. The torch power unit includes a compressor and a moisture remover coupled to the compressor.

A method is provided that includes compressing a gas via a compressor, and removing the moisture from the gas prior to supplying the gas to a torch.

Another method is provided that includes providing a moisture remover to reduce moisture in a gas supplied to a torch.

In another embodiment, a system for a torch power unit is provided that includes a moisture remover. The moisture remover comprises a heat exchanger configured to couple to the output of the compressor and a dryer configured to couple to the heat exchanger.

In yet another embodiment, a system is provided that includes a torch power unit. The torch power unit comprises a plasma cutting circuit, a compressor, a motor coupled to the compressor, and a moisture remover. The moisture remover comprises a heat exchanger coupled to the compressor, a filter coupled to the heat exchanger, and a dryer coupled to the filter.

DRAWINGS

Figure 2:
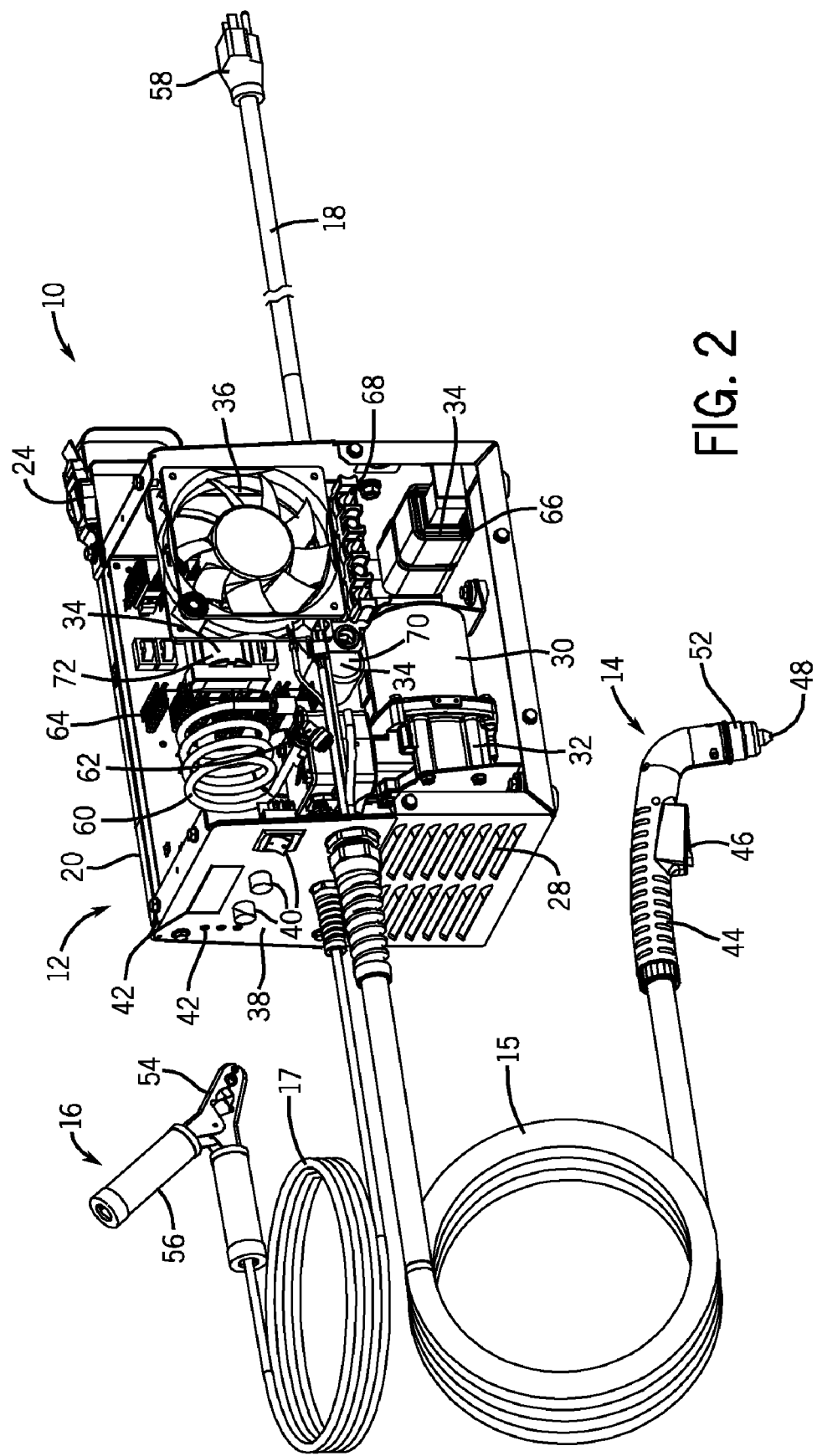
Figure 3:
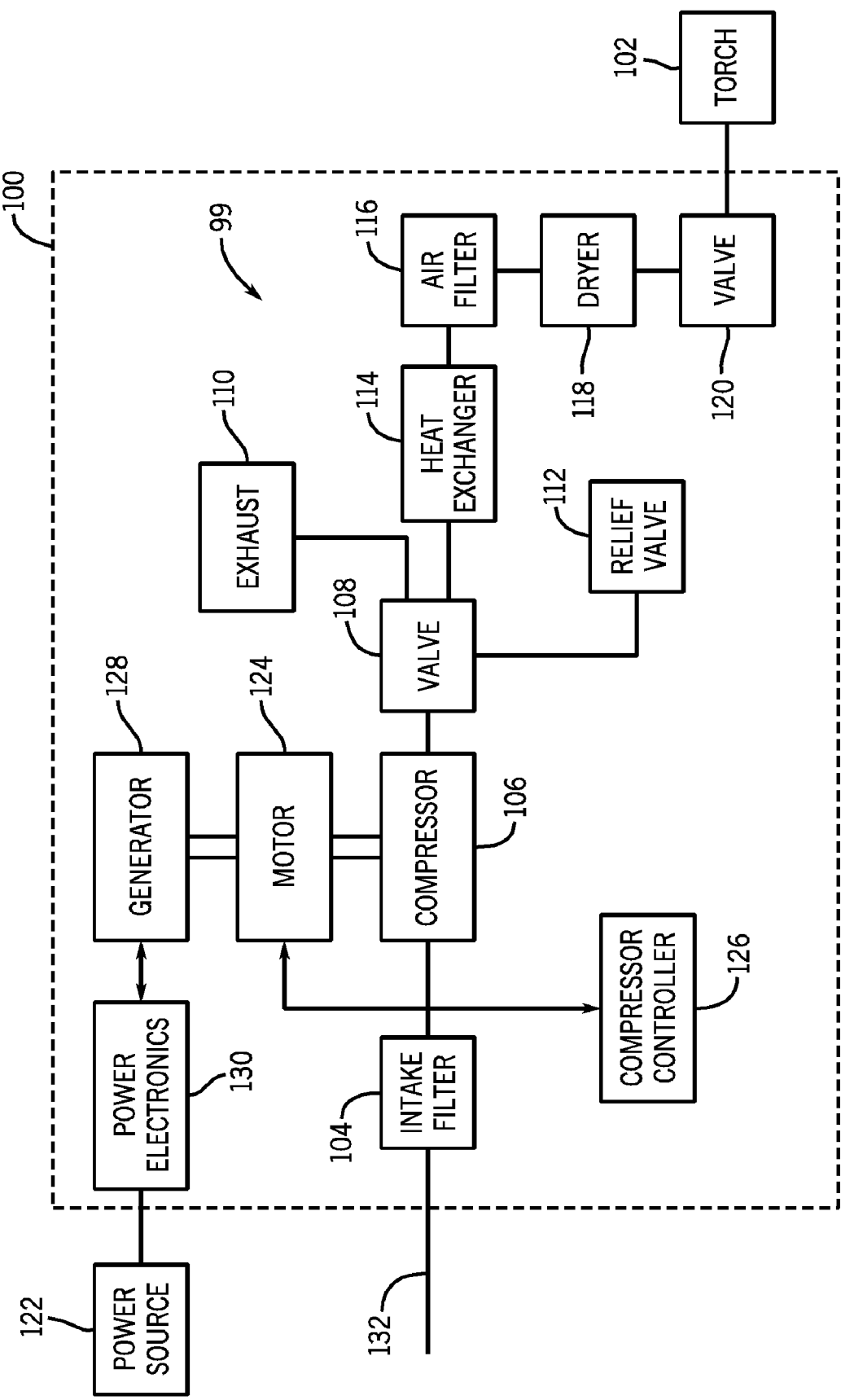

These and other features, aspects, and advantages of the present invention will become better understood when the following detailed description is read with reference to the accompanying drawings in which like characters represent like parts throughout the drawings, wherein:

FIG. 1 is a partial perspective view of an exemplary plasma cutting system having a gas compressor in accordance with embodiments of the present invention;

FIG. 2 is another partial perspective view of the plasma cutting system as illustrated in FIG. 1, wherein an entire side panel assembly is removed to further illustrate various internal features in accordance with embodiments of the present invention; and FIG. 3 is a block diagram of a heat exchanger and moisture removal system in a plasma cutting system in accordance with an embodiment of the present invention.

DETAILED DESCRIPTION

Referring now to the drawings, FIGS. 1 and 2 are partial perspective views illustrating an embodiment of a portable plasma cutting system 10. Specifically, FIG. 1 illustrates the system 10 with access panels completely assembled to close internal components, whereas FIG. 2 illustrates an entire side panel assembly removed to provide a better view of the internal features and components of the system 10. As discussed in further detail below, embodiments of the system 10 include a heat exchanger and moisture removal system configured to remove moisture from a compressed air stream. The entrained moisture may result from environmental conditions such as high relative humidity in combination with the compression cycle of the compressor.

The illustrated plasma cutting system 10 includes a torch power unit 12 coupled to a plasma torch 14 and a work piece clamp 16 via a torch cable 15 and a work piece cable 17, respectively. The torch power unit 12 may be coupled to a power source (e.g., a power grid or a motor-driven generator) via a power cable 18. The power source may provide a pilot current to a cathode, such as a movable electrode, and to the anode, such as the nozzle of the torch 14, that are forced into contact via a spring. After electrical current begins to flow from the electrode to the nozzle of the torch 14, gas or air supplied to the torch 14 counteracts the spring force and moves the electrode away from the nozzle. This breaks the electrical contact between the electrode and the nozzle and creates the pilot arc. Also, as the electrode moves away from the nozzle, it opens a nozzle orifice (connected to the air supply), and a plasma jet is created. The plasma jet causes the arc to transfer (at least in part) to the work piece held by the clamp 16, thus initiating cutting. Electronics in the power source sense when the arc has transferred and then supply a main cutting current of greater amperage after the transfer has occurred. Also, the tip of the torch 14 is disconnected (electrically), interrupting the pilot current path. Thus, the current is used to cut the work piece, and follows a path including the positive terminal, the work piece and the electrode. For example, the power unit 12 may be configured to supply a suitable voltage and current to create an electrical circuit from the unit 12, along the cable 15 to the torch 14, across a gap between the torch 14 and a work piece (e.g., as an electrical arc), through the work piece to the clamp 16, through the cable 17 back to the unit 12. In alternate embodiments, a non-moving electrode torch may be used in which a pilot arc is created via a high voltage and/or high frequency circuit, so that the high voltage may cause the arc to jump from the non-moving electrode to the nozzle. In yet other embodiments, any suitable torch and starting technique may be used.

The power unit 12 includes an enclosure 20 defining a generally closed volume to support various circuits, sensor features, control features, and gas supply features (e.g., air compressor). As discussed in detail below, the illustrated system 10 includes a variety of features to improve portability, serviceability, reliability, and control of the plasma torch 14 and the components within the single enclosure 20 of the system 10. For example, the system 10 may include sensors and controls to adjust the power unit 10 to account for various conditions, e.g., altitude, temperature, pressure, and so forth. The illustrated system 10 also may include a handle 22 on the top side of the enclosure 20 to enable easier transportation of the system 10. The illustrated system 10 also may include a latching mechanism 24 that may secure the torch 14, the cable 17, the clamp 16, and/or the power 18. The latching mechanism 24 may be unlatched or removed to enable removal of the top portion 26 of the enclosure and provide access to the internal components. The enclosure 20 may also include vents 28 to relieve heat and/or pressure inside the system 10. Additional vents may be located on other panels of the enclosure 20.

To provide for operation of the plasma torch 14, the system 10 may include a compressor motor 30, such as a DC or AC motor that may include brushed, brushless, switched, reluctance, or any other suitable type of motor, and a compressor 32. For example, the compressor 32 may include a positive displacement compressor, such as reciprocating compressor (e.g., piston-cylinder), a rotary screw compressor (e.g., helical screws to compress a gas continuously without a storage tank), diaphragm compressor, or the like. In certain embodiments, the system 10 may include a flow meter or sensor configured to monitor output of the compressor 32. The system 10 also may include sensors, such as a pressure sensor, a temperature sensor, a humidity/moisture sensor, or a combination thereof, to provide feedback used to adjust the motor 30, the compressor 32, power electronics 34, or a combination thereof. The power electronics 34 may be configured to condition and provide power to the torch 14 and the compressor 32, and may include transformers, circuit boards, and/or other components. A fan 36 may also be included inside the system 10 to provide air circulation and cooling to the system 10. Additionally, as depicted in FIG. 2, the fan 36 may be located next to one of the vents 28 to optimize air circulation. Additional fans 36 may be included at other locations inside or outside the enclosure 20.

In the illustrated system 10, a control panel 38 is included at an end of the power unit 12. The control panel 38 may include various control inputs, indicators, displays, electrical outputs, air outputs, and so forth. In an embodiment, a user input 40 may include a button, knob, or switch configured to enable selection of a mode of operation (e.g., plasma cut, weld, etc.), power on/off, an output current level, an gas (e.g., air) flow rate, an gas (e.g., air) pressure, a work piece type, a control type (e.g., manual or automatic feedback control), or a combination thereof. The control panel 34 may also include various indicators 42 to provide feedback to the user. For example, the indicators 42 may include one or more light emitting diodes (LED) and/or liquid crystal displays (LCD) to display on/off status, current level, voltage level, gas (e.g., air) pressure, gas (e.g., air) flow, environmental conditions (e.g., altitude, temperature, pressure, humidity, etc.), or any other parameter. Additionally, the indicators 42 may include an LED or LCD that displays a trouble or warning indicator if there is a problem with the system 10. Embodiments of the control panel 38 may include any number inputs and outputs, such as welding methods, air compressor settings, oil pressure, oil temperature, and system power.

Further, the user inputs 40 and indicators 42 may be electrically coupled to control circuitry and enable a user to set and monitor various parameters of the system 10. For example, the indicators 42 may display environmental conditions (e.g., altitude, temperature, pressure, humidity, etc.) that prompt a user to manually adjust the current, voltage, gas flow rate, gas pressure, moisture remover, or other operational parameters, or a combination thereof. The indicators 42 also may prompt a user to enable the system to perform automatic adjustments in view of the sensed environmental conditions. For example, one of the inputs 40 may enable a user to select an automatic feedback control mode based on environmental conditions and/or sensed parameters of the system 10 (e.g., compressor output).

The plasma torch 14 includes a handle 44, a locking trigger 46, a tip 48, a retaining cap 52, as well as an electrode inside the torch 14. The clamp 16 comprises an electrically conductive material clamping portion 54 having insulated handles 56. The power cable 18 includes a plug 58 for connection to a power source such as a wall socket or a motor-driven generator. The plug 58 may be configured to work with a variety of sockets or outlets, and the system 10 may receive different power sources, such as AC 50/60 Hz, 400 Hz, single or three phase 120V, 230V, 400V, 460V, 575V, etc.

Turning now in more detail to FIG. 2, the system 10 includes the fan 36, the gas compressor 32, a heat exchanger 60, pneumatic coupling 62, and heat sinks 64. Additionally, the power electronics 34 includes ground fault circuit interrupt (GFCI) dual inductor 66, primary terminal block 68, bus capacitor 70, and transformer 72. Additionally, the system 10 may include additional inductors, terminals, capacitors, transformers, or other electrical components and is not limited to the components illustrated in FIGS. 1-2.

As mentioned above, the gas compressor 32 may be a reciprocating compressor (e.g., piston-type compressor), a diaphragm compressor, or a rotary screw compressor. In the illustrated embodiment, the gas compressor 32 is a single stage reciprocating compressor. The compressor 32 may include or may be connected to the DC or AC motor 30 that is connected to power electronics 34 inside the system 10, such that the motor 30 drives the compressor 32. The gas compressor 32 may be rigidly mounting inside the enclosure 20 using compressor mounts such as rubber mounts, plastic mounts, metal mounts, or any other material. The compressor mounts may be configured to dampen vibrations of the compressor or to allow slight movement of the compressor during operation.

In the illustrated embodiment, the gas compressor 32 intakes and compresses air directly from the atmosphere, such as via a filter, and may use one of the vents 28 as an intake vent to enable air to flow into the compressor 32. The gas used by the compressor 32 may be a gas, such as nitrogen, argon, hydrogen, oxygen, or any combination thereof. Accordingly, the gas compressor 32 may provide a direct supply of compressed gas (e.g., air) on-demand to a desired application, such as the plasma torch 14. Thus, the torch 14 may consume air directly from the unit 12 without the air being compressed into a tank downstream of the compressor 32. However, alternative embodiments may include an air tank configured to store the compressed air.

To ensure reliability and performance for the system 10, various temperature sensors (e.g., thermistors) may be included inside the enclosure 20 to measure the temperature of various components. For example, the system 10 may include a temperature sensor configured to measure the temperature of the motor 30, the compressor 32, the power electronics 34, atmospheric air, and so forth. In addition to each temperature sensor, the system 10 may include control and/or monitoring logic to receive signals from the temperature sensors and perform the appropriate action or indication. For example, if the signal from one or more of the temperature sensors (e.g., thermistors) exceeds a threshold temperature or voltage for a component, then the control and monitoring logic may provide a visual warning by activating a LED or LCD 42 on the control panel 38. If the signal from a temperature sensor (e.g., thermistor) exceeds another threshold temperature or voltage and/or the signal remains above the threshold for a specific duration, then the control and monitoring logic may shutdown the system 10 or that component. The control and monitoring logic may prevent use of the system 10 until the signals from the temperature sensors fall below the threshold levels.

The system 10 may also include control circuitry to coordinate functions of the system components. For example, the system 10 may include control circuitry in the vicinity of the control panel 34. In one embodiment, the control circuitry may include a processor, memory, and software code configured to control and or coordinate operation of the system 10.

The system 10 may include cooling components such as the heat sinks 64 and may include active cooling via the fan 36. The heat sinks 64 may be mounted such that airflow from the fan 36 circulates air around the heat sinks, further enhancing the cooling capability of the heat sinks 64. As discussed above, additional fans may be included in other locations in the system 10. Similarly, additional heat sinks may be placed inside the system 10 depending on those areas that need passive cooling and/or cannot be cooled by any of the fans in the system 10. Thus, in other embodiments, the system 10 may include any number and combination of active and passive cooling components.

During operation of the system 10, a user first connects the system to a power source via the power cable 18 and the plug 58. A user may then turn on the system 10 via the user input 40. The compressor 32, fan 36, and other components of the system 12 receive power from the power electronics 34 and begin operation after the user input is activated and the control circuitry calls for operation. A user then attaches the clamp 16 to a work piece (e.g., metal or other material) to be cut. To begin cutting the work piece, the user places the cutting torch 14 adjacent the work piece and activates the trigger 46, which may involve raising a locking mechanism to free the trigger 46 before depressing the trigger 46. Compressed gas from the gas compressor 32 passes through the heat exchanger 60 and through the torch cable 15 and out the tip 48 of the torch 14. As discussed above, a pilot current may be supplied between a moveable electrode and the nozzle of the torch 14, thus establishing a pilot arc when the moveable electrode is pushed away from the nozzle of the torch 14 by the gas supplied by the compressor 32. As the electrode moves away from the nozzle of the torch, gas flowing through the torch 14 is energized into a plasma jet which in turn transfers the arc to the work piece.

The electrical arc heats up the gas from the compressor 32, converting it to plasma that is hot enough to cut the work piece. As the user moves the torch 14 across the work piece by dragging, using a drag shield, standoff guide, or the like, the material is cut as the plasma moves through the material. The thickness of the material being cut may be limited by the power of the system 10, the output of the compressor 32, and the torch 14. In addition to supplying the plasma, the compressed gas from the compressor 32 cools the torch 14 and blows away molten material (e.g., molten metal). At the end of the cut, the user releases the trigger 46 of the torch 14. Gas may continue to flow through the torch 14 for a period of time sufficient to cool the consumables, in a state known as "postflow." The postflow cools the torch 14 and ensures that any remaining material is blown away.

To provide the primary functions of the cutting process, such as providing plasma and providing a stable arc, cooling the torch, and blowing away material, the compressor 32 supplies the torch with a minimum amount of pressure and gas (e.g., air) flow rate. For example, in one embodiment, the torch 14 may receive about 70 psi and about 6 cfm of air flow. It should be appreciated that pressure and air flow rate are directly correlated. If the pressure generated by the compressor 32 decreases, for example, the air flow rate supplied by the compressor 32 may also decrease. Decreases in pressure and gas flow rate may affect the cutting process. For example, if the gas flow rate decreases, then cutting speed may also decrease, as plasma may be generated at a lower rate, and the user may move the torch 14 slower to cut a given thickness of metal. Additionally, a reduced flow rate also impacts the cooling rate of the torch 14, and may eventually lead to overheating of the torch 14. The overheating effect may be compounded by the increase in molten metal or other material that is not blown away as quickly due to the reduced flow rate. Over time, the reduced cooling may shorten the life of the consumable components of the torch 14.

As discussed above, the portability of the plasma cutting system 10 allows the system 10 to be moved to different areas. In some cases, the location of the system 10 may be in an area of relatively high humidity, e.g. above 90% humidity. Such areas may be related to environmental factors, such as proximity to the ocean, or may be a result of artificial factors, such as humidifiers or moisture-producing machines in a workshop.

In such locations, the compressor 32 may entrain moisture in the compressed air. The moisture is a result of the high relative humidity of the atmospheric air drawn into the compressor and the compression cycle (the Carnot cycle). As the moisturized compressed air passes through the heat exchanger 60, the temperature of the air may drop below the dew point of water at that pressure, thus resulting in condensation forming in the air. As the air flows out of the tip of the torch, water condensation may appear at the tip of the torch 14. A user of the system 10 may perceive the appearance of water as undesirable or as a fault in the system. Additionally, the water in the torch 14 may reduce cutting performance. Further, the consumables in the torch may degrade faster, as the moisture, or minerals and/or contaminants in the moisture, may contact the consumables during the condensation.

FIG. 3 depicts a block diagram of a moisture/water removal system 99 for a plasma cutting system 100 in accordance with an embodiment of the present invention. The block diagram illustrates the various components that provide compressed air to a plasma cutting torch 102, including an intake filter 104, a compressor 106, a solenoid valve 108, an air exhaust 110, and a relief valve 112. The water removal system 99 includes an air-to-air heat exchanger 114, an air filter 116, and a dryer 118. A final solenoid valve 120 is included after the dryer 118.

The illustrated system 100 may be connected to a power source 122, such as a power grid or a power generator. The compressor 106 is driven by a motor 124, which is controlled by a compressor controller 126. As discussed above, the motor 124 may be an electric motor, such as a DC or AC motor that may include brushed, brushless, switched, reluctance, or any other suitable type of motor, or a gas combustion engine. For example, the motor 124 may include a two-stroke or four-stroke spark-ignition engine, which includes one or more reciprocating piston in cylinder assemblies, a carburetor or fuel injection system, and so forth. Some embodiments of the system 100 may include a power generator 128 built-in or integrally disposed within the system 100. Thus, the motor 124 may drive both the compressor 106 and the generator 128, thereby making the system 100 completely portable for use in remote locations. However, other embodiments may exclude the generator 128 to reduce the size, weight, and cost of the system 100. Additionally, power electronics 130 provide the power management functions for the system 100. In some embodiments, the power electronics 130 may include a plasma cutting circuit, a welding circuit an induction heating circuit, a power conditioning circuit, a user input/interface circuit, a power generator circuit (e.g., if the system 100 includes the generator 130), or a combination thereof.

During operation of the plasma cutting system 100, the compressor 106 draws in the air through the air intake 132, such as a vent. The air passes through the intake filter 104 to remove particulates and contaminants from the air. The intake filter may be a wet or dry filter, and may be paper, foam, fabric, plastic, or any other suitable material. After compression, the air exits the compressor 106 and passes to solenoid valve 108. In one embodiment, the solenoid valve 108 may be a body ported 3-port solenoid valve. One port of the valve 108 may exit to the air exhaust 110, which may be used to exhaust excess air from the compressed air stream. Another port of the valve 108 may exit to the relief valve 112. The relief valve 112 may be configured to release pressure from the system if the pressure reaches a threshold. For example, if there is a block or clog in the system downstream from the compressor 106, such as in the air filter 116, the relief valve 112 may open to prevent damage to components in the system due to high pressure and/or back pressure conditions. In some embodiments, it may be desirable to purge and decompress the pressurized gas feeding the torch as quickly as possible to ensure rapid re-fire of the plasma torch. In such an embodiment, the 3-way valve having an exhaust port for the pressurized gas may aid or provide this function. Additionally, the 3-way valve may provide additional functions as discussed further below, and may be placed in the same location as relief valve 112 or may be downstream from the heat exchanger 114.

Turning now to the moisture/water removal system 99, in the embodiment depicted in FIG. 3, the heat exchanger 114, the air filter 116, and the dryer 118 work together to remove moisture from the compressed air and reduce or eliminate condensation in the torch 102. Initially, the compressed air stream passes through the heat exchanger 114, wherein it is cooled to a minimum temperature, e.g., below the dew point. In one embodiment, the heat exchanger 114 may be a shell and tube heat exchanger having any configuration and number of fins to aid in cooling. In another embodiment, the exchanger 114 may be an evaporator of a vapor compression cycle system, which includes a coolant (e.g., refrigerant) in a closed loop including evaporator, a compressor, a condenser, and the pressure reducing device. In yet another embodiment, the heat exchanger 114 may be selected and configured to lower the temperature of the gas such that condensate may form. In such an embodiment, the heat exchanger 114 or the connection from the heat exchanger 114 to other components in the system 99 may include a drain to allow condensate to drain from the gas as it moves through the system 99. In some embodiments using the 3-way valve mentioned above, the drain may be one of the ports of the 3-way valve. For example, the 3-way valve may be placed downstream of the heat exchanger 114 to drain or dump the condensed water from the gas.

To maximize the efficacy of the downstream dryer 118 and the performance of the moisture removal system 99, the heat exchanger 114 may be configured to cool the compressed air stream to a minimum temperature. For example, in one embodiment using a plasma torch having a 25-foot cable, the compressed air stream may be cooled to about 10° C. above ambient temperature. The length and volume of the heat exchanger, as well as the configuration and number of fins, may be designed to ensure that a minimum temperature for a given torch is reached, based on the expected ambient temperatures in which the system 100 may be used. In one embodiment, the heat exchanger may a have a length of about 2.625 inches, a width of about 2.625 inches, and a height of about 2.375 inches. In addition to the heat exchanger, some embodiments may include one or more fans adjacent to the heat exchanger or elsewhere in the system 100 to create air flow over the heat exchanger 114.

After the compressed air stream is cooled by the heat exchanger 114, it may pass through the air filter 116 to remove particulates and contaminants from the air stream. Further, additional moisture may be removed by the air filter 116. The air filter 116 may be paper, foam, fabric, plastic, or any other suitable material. After filtering, the air stream passes through the dryer 118. The dryer 118 may be a desiccant or other suitable moisture remover. In one embodiment, the desiccant may be a desiccant filter manufactured by Parker Hannifin Corporation, Pneumatics Division, of Richland, Mich. Additionally, the dryer 118 may be selected to minimize the pressure drop across the dryer 118, such that a minimum pressure is still supplied to the torch 102. In one embodiment, the compressed air stream experiences about 2 psi pressure drop across the dryer 118. After the compressed air stream exits the dryer 118, it may pass through another valve 120. As described above, in some embodiments, the valve 120 may be a body ported 3-port solenoid valve providing a drain through one port, and/or a pressure relief through another port. In some embodiments, such a valve may be placed at any point downstream from the heat exchanger 114. Finally, the dried compressed air stream flows to the torch 102.

Thus, at the point which the compressed air stream flows through the torch 102, most or all of the moisture is removed. As discussed above, removing moisture from the compressed air stream reduces or eliminates condensation at the torch exit and may improve cutting performance. Further, by reducing or eliminating moisture in the air stream, the life of consumables in the torch 102 may be extended due to less exposure to moisture, minerals and/or contaminants in the air stream.

In other embodiments, any number of filters, heat exchangers, or dryers may be used. For example in one embodiment, two heat exchangers in series may be used before the air stream enters the air filter 116 and dryer 120, Other embodiments may use heat exchangers in parallel, two dryers in series, two dryers in parallel, etc. Alternatively, other embodiments may eliminate some of the components, such as removing the intake filter, air filter, etc.

It should be appreciated that the heat exchanger and moisture removal systems are applicable to other portable systems using a gas compressor. For example, an engine-driven welding system that includes an engine, generator, and gas compressor may also implement a heat exchanger and moisture removal system described herein. Such a system may be in a single portable enclosure with wheels.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A system, comprising:
a torch power unit, comprising:

a compressor configured to output a first compressed gas flow; and a moisture remover coupled to the compressor, wherein the moisture remover is configured to remove moisture from the first compressed gas flow to produce a second compressed gas flow for supply to a plasma cutting torch, the second compressed gas flow has less moisture than the first compressed gas flow, and the plasma cutting torch is configured to energize the second compressed gas flow through the plasma cutting torch to convert the second compressed gas flow into a plasma stream to enable plasma cutting of a work piece.

2. The system of claim 1, wherein the moisture remover comprises a filter.

3. The system of claim 1, wherein the moisture remover comprises a dryer.

4. The system of claim 3, wherein the dryer comprises a desiccant.

5. The system of claim 1, wherein the moisture remover comprises a heat exchanger configured to cool the output of the compressor, condense moisture from the output of the compressor, or combination thereof.

6. The system of claim 1, wherein the moisture remover comprises a vapor compression cycle.

7. The system of claim 1, wherein the heat exchanger comprises a shell and tube heat exchanger.

8. The system of claim 1, wherein the torch power unit comprises a power generator.

9. The system of claim 8, comprising a 3-way valve configured to relieve pressure, drain moisture, or any combination thereof.

10. The system of claim 1, comprising the plasma cutting torch, wherein the moisture remover is configured to reduce condensation within the plasma cutting torch.

11. A method, comprising:
compressing a gas via a compressor;
removing moisture from the gas prior to supplying the gas to a torch; and
energizing the gas flowing through the torch to convert the gas into a plasma stream.

12. The method of claim 11, wherein removing moisture comprises cooling the gas exiting the compressor.

13. The method of claim 11, wherein removing moisture comprises cooling the gas to a temperature no more than about 10° C. above ambient temperature.

14. The method of claim 12, wherein cooling the gas comprises flowing the gas over an evaporator of a vapor compression cycle.

15. The method of claim 12, wherein cooling the gas comprises flowing the gas through a heat exchanger.

16. The method of claim 11, wherein removing moisture comprises condensing moisture from the gas.

17. The method of claim 16, wherein removing moisture comprises draining condensate from the gas.

18. The method of claim 17, wherein draining condensate from the gas comprises draining condensate via a port of a 3-way valve.

19. The method of claim 11, wherein removing moisture comprises flowing the gas through a dryer, a filter, or combination thereof.

20. The method of claim 11, wherein removing moisture comprises reducing condensation within the torch.

21. A method of manufacturing a torch system, comprising:
providing a moisture remover to reduce moisture in a gas supplied to a plasma cutting torch, wherein the plasma cutting torch is configured to energize the gas flowing through the plasma cutting torch to convert the gas into a plasma stream to enable plasma cutting of a work piece.

22. The method of claim 21, comprising retrofitting the moisture remover to a torch power unit, wherein the torch power unit is configured to supply the gas and electrical energy to the plasma cutting torch to generate the plasma stream to enable the plasma cutting of the work piece.

23. A system for a torch power unit, comprising:
a moisture remover, comprising:
a heat exchanger configured to couple to the output of a compressor;
a dryer configured to couple to the heat exchanger, wherein the heat exchanger and the dryer are configured to remove moisture from a gas output from the compressor for supply to a torch, and the torch is configured to energize the gas flowing through the torch to convert the gas into a plasma stream.

24. The system of claim 23, comprising a filter configured to couple to the heat exchanger, the dryer, or a combination thereof.

25. A system, comprising:
a torch power unit, comprising:
a plasma cutting circuit;
a compressor;
a motor coupled to the compressor;
a moisture remover, comprising:
a heat exchanger coupled to the compressor;
a filter coupled to the heat exchanger; and
a dryer coupled to the filter, wherein the heat exchanger and the dryer are configured to remove moisture from a gas output from the compressor for supply to a plasma cutting torch, and the plasma cutting torch is configured to energize the gas flowing through the torch to convert the gas into a plasma stream to cut a work piece.

* * * * *